No. 723,415. PATENTED MAR. 24, 1903.
G. SMITH.
MONEY SAVING BOX OR PURSE.
APPLICATION FILED JUNE 7, 1902.
NO MODEL. 2 SHEETS—SHEET 1.
FIG. 2. FIG. 1.
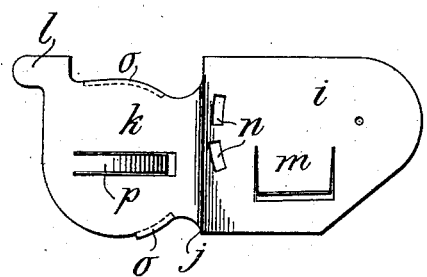
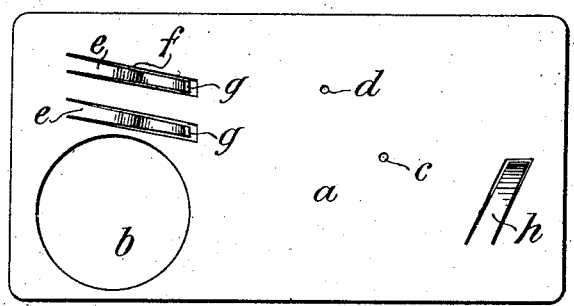
FIG. 3.
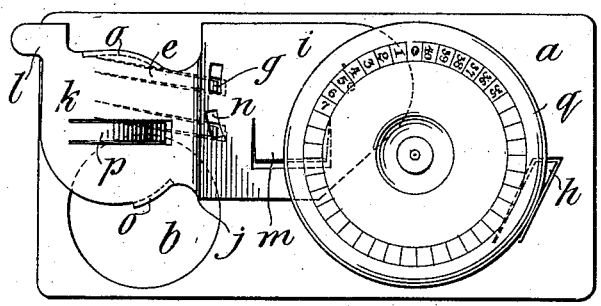
FIG. 5ᴬ
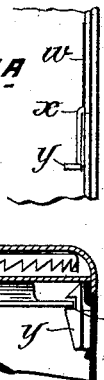
FIG. 4. FIG. 5.
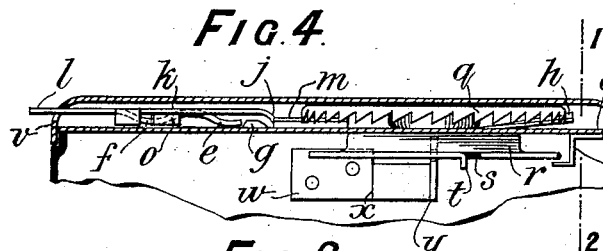
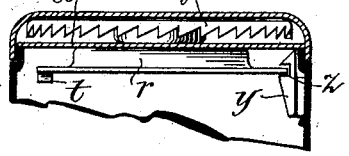
FIG. 6.
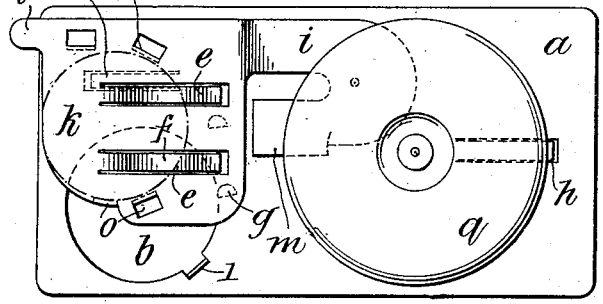
FIG. 7. FIG. 8.
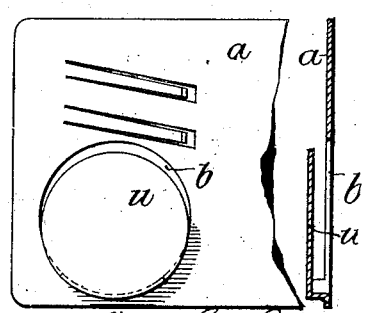
Witnesses:
Henry Thieme
George Barry Jr.
Inventor: George Smith
by attorneys
Brown & Seward No. 723,415. PATENTED MAR. 24, 1903.
G. SMITH.
MONEY SAVING BOX OR PURSE.
APPLICATION FILED JUNE 7, 1902.
NO MODEL. 2 SHEETS—SHEET 2.
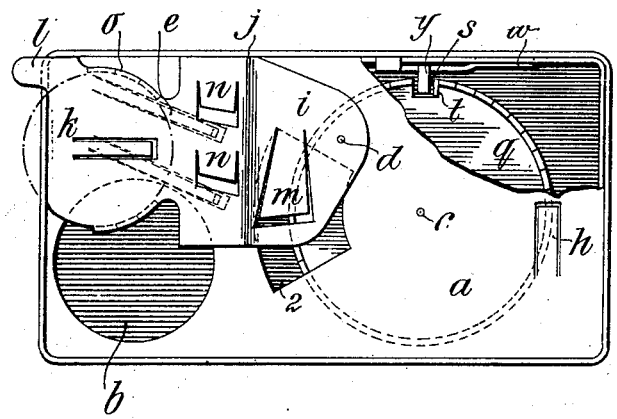
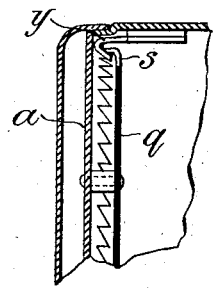
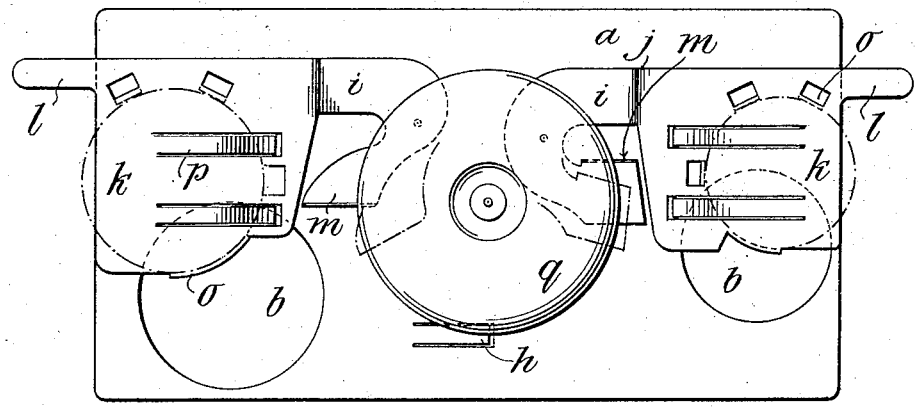
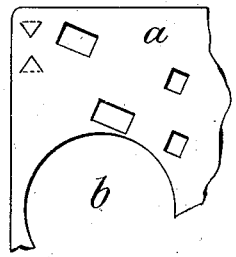
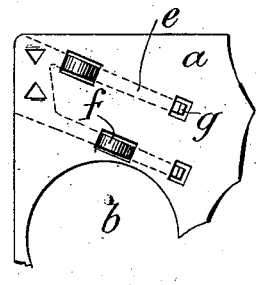
Witnesses:—
Henry Thieme
George Barry Jr
Inventor:—
George Smith
by attorneys
Brown & Seward

UNITED STATES PATENT OFFICE.

GEORGE SMITH, OF LONDON, ENGLAND.

MONEY-SAVING BOX OR PURSE.

SPECIFICATION forming part of Letters Patent No. 723,415, dated March 24, 1903.

Application filed June 7, 1902. Serial No. 110,595. (No model.)

*To all whom it may concern:*

Be it known that I, GEORGE SMITH, a subject of the King of England, and a resident of 8 Red Lion Square, Holborn, London, England, have invented a certain new and Improved Money-Saving Box or Purse, of which the following is a specification.

In the accompanying drawings, Figure 1 is top view of the foundation-plate for a single-coin money-box detached. Fig. 2 is a top view of an operating-lever detached. Fig. 3 is a top view of the plate with the lever and a ratchet-wheel in position. Fig. 4 is a longitudinal section of the box, showing a slight modification in the arrangement of the lever. Fig. 5 is a cross-section on the line 1 2, Fig. 4. Fig. 5$^A$ is a plan view of a spring-catch detached. Fig. 6 is a plan view of the mechanism shown at Figs. 4 and 5 removed from the box. Figs. 7 and 8 are respectively a plan and cross-section showing a slight modification in the formation of the coin-opening to the box. Fig. 9 is a plan view showing a further modification with part of the plate broken away, and Fig. 10 is a cross-section of the same. Fig. 11 is a plan view detached of a modified form of spring-catch. Fig. 12 is a plan view of part of the foundation-plate as arranged to receive it. Fig. 13 shows the spring-catch of Fig. 11 and the foundation-plate of Fig. 12 assembled. Fig. 14 is a plan view showing how the invention can be adapted for two kinds of coins—say pennies and half-pennies or sixpences and shillings.

In all the figures the parts are drawn on an enlarged scale, and the same letters and figures of reference refer to corresponding parts.

This invention relates to that class of money-saving box or purse which when locked is so retained until a prearranged number of coins has been placed therein, the object of the invention being, first, to simplify the construction of such boxes or purses; second, to provide against the operating of the locking device by any ordinary means other than a coin; third, to provide against the withdrawal of a coin after the register has been moved, and, fourth, to prevent the moving of the locking disk after the exact number of coins has been inserted—that is to say, when zero is reached.

In money-saving boxes or purses of the class above referred to the general construction hitherto has been of a complicated character having a number of delicate parts which entailed a comparatively high cost of production, the said parts readily getting out of order, so that the box would not work, the locking device could be readily unlocked by means of, say, a knife-blade, so that the registering mechanism could be operated without the insertion of a coin, and it was also possible to operate the register with a coin and then withdraw the coin.

In carrying out my invention I employ an oblong or other suitably-shaped metal box with a hinged cover or lid, the locking being effected by means of a spring-catch in the box-body taking over the edge of a graduated disk in the cover, to which a step-by-step motion is given every time the box is operated, on the insertion of a coin, until a notch in the disk comes opposite the spring-catch, when the lid will be free to open.

The parts of the mechanism are carried by a foundation-plate, which is conveniently fixed inside the cover or lid of the box.

So far I have indicated only features that are old, and I will now proceed to describe the improvements, having reference to the accompanying drawings before mentioned.

Referring then to Fig. 1, $a$ is the foundation-plate, and $b$ the coin-opening formed in one corner thereof. $c$ is a hole for the pivot of a ratchet-wheel, and $d$ the hole for the pivot of an operating-lever. At the opposite corner at the same end I strike up two tongues $e\ e$, preferably in a diagonal direction, longitudinally of the plate. In the length of each tongue I form a bulge $f$ for a purpose to be presently explained, and the free end of each tongue I turn up slightly to form a catch $g$. At the other end of the plate and near the bottom I strike up another tongue $h$, the free end of which is slightly turned up to act as a spring-pawl to retain a ratchet-wheel in position, as will be explained. Pivoted to this foundation-plate $a$ is a second plate of special form, which I prefer for convenience to term the "operating-lever" $i$, parts of which are shown in Figs. 2, 3, 4, and 6. This lever consists of a flat portion $i$, which lies on and works on the plate $a$, a turned-up portion $j$, equal to the thickness of a coin, and a circular extension $k$ with a finger $l$ at one side. In the flat portion $i$ I form a tongue $m$, which is intended to act as an operating-pawl to the ratchet-wheel above referred to, and two slots $n$ $n$, which will receive the two catches $g$ $g$ of the spring-tongues $e$ of the plate $a$ and limit or prevent the movement of the lever $i$ until the catches are forced out of the slots, as will be presently explained. The edges of the circular part $k$ are turned down at $o$ $o$ a distance equal to the turned-up part $j$ of the plate or lever $i$, such distance corresponding to the thickness of the coin, as before stated, and in the part $k$ I form a tongue $p$ to act as a spring to press the coin down on the plate $a$ when inserted and also to force a sticky coin through the opening $b$ into the box.

Pivoted to the plate $a$, above the lever $i$ and in such a position that the pawls $h$ $m$, before mentioned, will take into the teeth, is a ratchet-wheel $q$, having teeth on its under side, with which a locking-disk $r$ is rigidly connected in any convenient manner. (See Figs. 4 and 5.) This ratchet-wheel $q$ may be produced by stamping from a disk blank with teeth around the edge and by a second operation turning the teeth down at right angles, as seen at Figs. 4, 5, and 10, or the teeth may be formed by a series of short tongues extending downward from the under side of the disk. The locking-disk $r$ is dish-shaped, with a broad rim like a miniature soup-plate, (see Figs. 4 and 5,) graduations being marked on the rim, where also a notch $s$ is formed. In forming this notch $s$ the piece removed is turned down to form a stop $t$. The ratchet-wheel $q$ may be placed on one side of the foundation-plate $a$ and the locking-disk $r$ on the other, and by turning the disk to bring a number corresponding to the number of coins it is desired to collect in the box opposite a pointer $a'$ the ratchet-wheel $q$ will be set to work the locking-disk $r$ around in order that the notch $s$ may at the right moment free a catch secured to the box-body. The ratchet-wheel and locking-disk may, however, be combined in one, as shown at Figs. 9 and 10. The coins are inserted through a slot $v$ in the turned-down edge of the cover or lid of the box, (see Fig. 4,) and the finger $l$ on the lever $i$ will project through the same slot.

The operation of the appliance is as follows: A coin is inserted in the slot $v$ under the lever $i$, and as it enters it will press against the two springs $e$ $e$ by contact with the bulges $f$ and push the catches $g$ out of the slots $n$ $n$ (see Fig. 3) or raise the springs $e$ $e$ above the catches $g$ $g$. (See Fig. 4.) The lever $i$ is thus released and can be moved to one side to such an extent as to bring the coin over the opening $b$, through which it will be pushed by the spring $p$ into the box. In Fig. 4 the springs $e$ $e$ will act the part of the spring $p$, and the spring $p$, Fig. 6, will take the place of $e$ in Fig. 3. The lever $i$ will also work the ratchet-wheel $q$ around one tooth, so as to bring the notch $s$ of the locking-disk $r$ so much nearer the spring-catch. When the notch $s$ arrives at the catch, the stop $t$ will come into operation and by striking against the catch on the box will prevent any further movement of the registering mechanism. The lid will now be free to open, as there is nothing to retain it.

The spring-catch on the box may be formed as shown at Figs. 4, 5, and 5$^a$—that is to say, of a strip of metal $w$, one end of which is riveted inside the box. The strip is bulged outward at $x$ and is bent at right angles at $y$. The edges of this part $y$ are beveled off away from the notch $z$, in which the locking-disk $r$ catches, as clearly seen at Fig. 5.

In the modification Figs. 4 and 6 the springs $e$ $e$ are formed in the part $k$ of the lever $i$, the equivalent for the catches $g$ being formed in the plate $a$ and being indicated by the same letter $g$. In fact, the spring portions may be said to be reversed, and the form of the lever is slightly modified. One of the turned-down portions $o$ of the lever strikes against a turned-up portion 1 of the plate $a$, which thus limits the movement of the lever in the forward direction; otherwise the action of this modification is the same as the arrangement first described.

Instead of completely stamping out the hole $b$ I may leave the part stamped up partly attached to the plate $a$, as seen at Figs. 7 and 8, so as to form what may be termed a "cover" $u$ to the hole, and this cover $u$ will extend just over the edge of the lever $i$ and will serve as a guide for the lever to keep it down in its place.

Fig. 9 shows a further slight modification in the form of the lever $i$ in place of the slots $n$ $n$, pawls being provided which I will also letter $n$ $n$, as they represent the mechanical equivalents. The ratchet-wheel $q$ and the locking-disk $r$ are, however, combined in this arrangement, the notch $s$ being formed in the edge of the wheel $q$, as seen in the figure. The plate $a$ is cut away at 2 to allow the pawl $m$ to project through and take into the teeth of the wheel $q$. The form of the locking-catch is slightly modified, as it has to take over the teeth of the ratchet, as seen at Fig. 10.

In place of forming the spring-catches $e$ $e$ in the plate $a$ I may find it desirable to produce them separate in the form shown at Fig. 11, and this piece will be attached to the plate $a$ by rivets or in any other convenient manner. One mode of securing this piece is by means of triangular tongues struck from the plate $a$, passed through slits in the spring-piece, and then folded down, as indicated in Fig. 13.

The arrangement of mechanism to take two coins will be clearly understood from the diagrammatic view Fig. 14 without further description, the only difference between this arrangement and those above described being that the lever for a penny (or the larger-coin side) has to move twice the distance of that for the half-penny, (or the smaller-coin side,) so as to ratchet the wheel around a distance equal to two teeth (the equivalent to the two half-pennies or other smaller coin) on each movement of the lever.

From the above description and an inspection of the drawings it will be seen that the number of parts is reduced to a minimum, and these parts are of the simplest construction, being all stamped out of sheet metal. The assembling of the parts is also of an extremely simple character, and there is nothing to get out of order with fair usage.

It will be seen that when the coin is inserted in the slot it will press down the two springs e e, and thus unlock the lever i; but as soon as the coin has moved a sufficient distance one of the springs will rise and by means of its bulge f will prevent the back motion of the coin. The size of the coin-orifice available is thus reduced, and the withdrawal of the coin after registering is rendered impossible.

By employing two springs of the character described it will be impossible to effect the movement of the registering-wheel by the insertion of an ordinary knife-blade, and if a blade wide enough to depress both springs be inserted then the lever will not work, as its movement will be arrested by the blade striking against the edge of the slot.

The top of the ratchet-wheel may also be graduated, and a little window may be made in the cover of the box, so that the graduations may show through.

What I claim as my invention, and desire to secure by Letters Patent, is—

1. In a registering money-box, the combination with the lid of the box, of a foundation-plate having a coin-opening, spring-catches provided with bulges, both catches and bulges adapted to project above the surface of said plate, a spring-retaining pawl integral with said plate, an operating-lever pivoted to said plate and having a portion to move parallel with and in contact with said plate and a recessed portion to move parallel with but at a distance from said plate and a portion extending beyond the lid, a spring-operating pawl integral with the first-named portion, stops for the catches in the same portion and a pressing-spring in the recessed portion, a ratchet-wheel having teeth underneath adapted to coöperate with the lever-pawl, a locking-disk rigidly connected with the ratchet-wheel to enter a notch in a spring-catch, and a spring-catch on the box, all substantially as herein described.

2. In registering mechanism for money-boxes, a foundation-plate having spring-catches formed with bulges and adapted to project above the face of said plate, a spring-retaining pawl, an operating-lever having notches for the spring-catches, an operating-pawl and a pressing-spring, a ratchet-wheel having teeth on its under side, and a locking-disk rigidly connected with the ratchet-wheel and provided with a stop set at a right angle to the face of the disk and having a notch in its edge, all substantially as herein described.

3. In a registering mechanism for money-boxes, a foundation-plate and an operating-lever pivoted thereto, two spring-catches for said lever carried by said plate and having bulges or projections to be depressed by the insertion of a coin and to rise successively behind the coin as it is moved forward by said lever, substantially as herein described.

In testimony whereof I have signed my name to this specification in the presence of two subscribing witnesses.

GEORGE SMITH.

Witnesses:
 ALFRED V. BISHOP,
 A. COSTA.